United States Patent
Acar et al.

(10) Patent No.: US 10,904,003 B2
(45) Date of Patent: Jan. 26, 2021

(54) VALIDATION OF SHORT AUTHENTICATION DATA WITH A ZERO KNOWLEDGE PROOF

(71) Applicant: Microsoft Technology Licensing, LLC, Redmond, WA (US)

(72) Inventors: Tolga Acar, Sammamish, WA (US); Malcolm Erik Pearson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 381 days.

(21) Appl. No.: 15/959,189

(22) Filed: Apr. 21, 2018

(65) Prior Publication Data
US 2019/0327091 A1 Oct. 24, 2019

(51) Int. Cl.
*H04L 29/06* (2006.01)
*H04L 9/32* (2006.01)
(Continued)

(52) U.S. Cl.
CPC .............. *H04L 9/3218* (2013.01); *G06F 7/58* (2013.01); *G06Q 20/3823* (2013.01);
(Continued)

(58) Field of Classification Search
CPC ..... H04L 9/321; H04L 63/08; H04L 63/0892; H04L 9/3226; H04L 63/12; H04L 63/083;
(Continued)

(56) References Cited

U.S. PATENT DOCUMENTS 8,015,398 B2 * 9/2011 Camenisch ........... H04L 9/3073
713/150
2012/0317034 A1 12/2012 Guha et al.
(Continued)

OTHER PUBLICATIONS

Pedersen, Torben Pryds, "Non-Interactive and Information-Theoretic Secure Verifiable Secret Sharing", CRYPTO 91, 1992, pp. 129-140.
(Continued)

*Primary Examiner* — Michael S McNally
(74) *Attorney, Agent, or Firm* — Rainier Patents, P.S.

(57) ABSTRACT

Described herein is a system and method for validating short authentication data by a server. Short authentication data associated with a particular user is received and a random number generated. The random number is stored by a client device. The short authentication data is committed by calculating a commitment value using the short authentication data, the generated random number and a secret value known only to the server. The server does not persistently store the short authentication data and/or the generated random number. The commitment value is utilized by the server in conjunction with a conjunction transaction to validate a presented short authentication data associated with a particular user and received random number. If a calculated value associated with the presented short authentication data equals the stored commitment value associated with the particular user, the computer transaction is allowed to occur. Otherwise, the computer transaction is blocked.

20 Claims, 6 Drawing Sheets

(51) Int. Cl.
*G06F 7/58* (2006.01)
*G06Q 20/38* (2012.01)

(52) U.S. Cl.
CPC .............. *H04L 63/08* (2013.01); *H04L 63/12* (2013.01); *H04L 2463/082* (2013.01)

(58) Field of Classification Search
CPC ... H04L 9/3218; H04L 2463/082; H04L 9/32; H04L 29/06; G06F 21/31; G06F 7/58; G06Q 20/3823; G06Q 20/38
USPC ........................................................ 713/168
See application file for complete search history.

(56) References Cited

U.S. PATENT DOCUMENTS

| | | | |
|---|---|---|---|
| 2013/0080787 A1* | 3/2013 | Lee .................... | H04L 9/3234 713/183 |
| 2013/0124292 A1* | 5/2013 | Juthani ................ | H04L 63/083 705/14.26 |
| 2014/0281525 A1 | 9/2014 | Acar et al. | |
| 2018/0091520 A1* | 3/2018 | Camenisch .......... | H04L 9/3218 |
| 2019/0327091 A1* | 10/2019 | Acar .................... | H04L 9/321 |

OTHER PUBLICATIONS

"International Search Report and Written Opinion Issued in PCT Application No. PCT/US2019/020981", dated Apr. 26, 2019, 13 Pages.

* cited by examiner

VALIDATION OF SHORT AUTHENTICATION DATA WITH A ZERO KNOWLEDGE PROOF

BACKGROUND

With increasing frequency, computer users are required to supply authentication data such as password(s), personal identification number(s) (PINs) in order establish their identify as part of computer transaction(s). Computer transaction(s) can include financial transactions, access to computer resources using a web site, etc.

SUMMARY

Described herein is a system for validating short authentication data, comprising: a processing system comprising a processor and a memory having computer-executable instructions stored thereupon which, when executed by the processor, cause the processing system to: receive, by a server, short authentication data associated with a particular user from a client device; generate, by the server, a random number; provide, by the server, the generated random number to the client device; commit to the short authentication data, by the server, by calculating a commitment value using the short authentication data, the generated random number and a secret value known only to the server; and store, by the server, the commitment value associated with the particular user, wherein the server does not persistently store the short authentication data and the generated random number.

Further described herein is a method of validating a presented short authentication data, comprising: receiving, by a server, in conjunction with a computer transaction, the presented short authentication data associated with the particular user and a stored random number from a client device; calculating, by the server, a value associated with the presented short authentication data using the presented short authentication data, the random number and a secret value known only to the server; retrieving, by the server, the stored commitment value associated with the particular user; determining whether or not the value associated with the presented short authentication data is equal to the stored commitment value; if the value associated with the presented short authentication data is equal to the stored commitment value, then the presented short authentication data is valid and the computer transaction is allowed to occur; and if the value associated with the presented short authentication data is not equal to the stored commitment value, then the presented short authentication data is not valid and the computer transaction is blocked from occurring.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
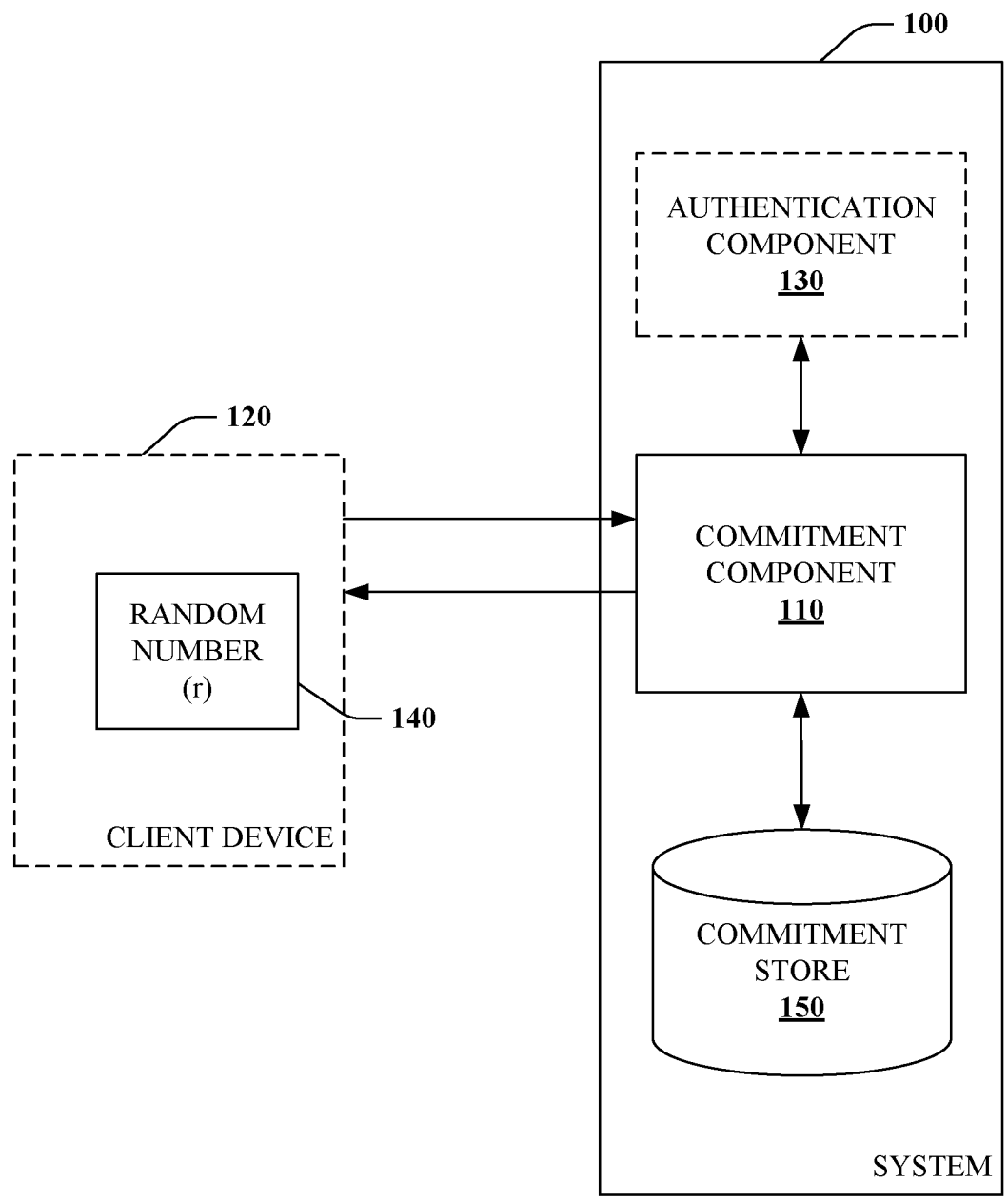
FIG. 1 is a functional block diagram that illustrates a system for validating short authentication data.

Various technologies pertaining to validation of short authentication data with a zero knowledge proof are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding validation of short authentication data with a zero knowledge proof. What follows are one or more exemplary systems and methods.

Aspects of the subject disclosure pertain to the technical problem of validating of short authentication data used in processing computer transaction(s). The technical features associated with addressing this problem involve receiving, by a server, the short authentication data associated with a particular user from a client device; generating, by the server, a random number; providing, by the server, the generated random number to the client device; committing to the short authentication data, by the server, by calculating a commitment value using the short authentication data, the generated random number and a secret value known only to the server; and storing, by the server, the commitment value associated with the particular user, wherein the server does not persistently store the short authentication data and the generated random number.

The technical features further involve subsequently validating a presented short authentication data using the stored commitment value by receiving, by a server, in conjunction with a computer transaction, the presented short authentication data and a stored random number; calculating, by the server, a value associated with the presented short authentication data using the presented short authentication data, the random number and a secret value known only to the server; retrieving, by the server, the stored commitment value; determining whether or not the value associated with the presented authentication is equal to the stored commitment value; if the value associated with the presented short authentication data is equal to the stored commitment value, then the presented short authentication data is valid and the computer transaction is allowed to occur; and, if the value associated with the presented short authentication data is not equal to the stored commitment value, then the presented short authentication data is not valid and the computer transaction is blocked from occurring. Accordingly, aspects of these technical features exhibit technical effects of more efficiently and effectively providing computer transaction security.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

In some scenarios, for security purposes, it is impermissible for a verifier, for example, a server or a service, to persistently store sensitive values such as passwords, personal identification numbers (PINs), and/or other short authentication data (e.g., card verification value(s) (CVVs)). In some scenarios, it is acceptable for the verifier to temporarily store sensitive values during validation and/or verification; however, these sensitive values are not permitted to be persistently stored.

Conventionally, in order validate a presented sensitive value, a verifier can utilize an external validation system. However, utilization of an external validation system each time a sensitive value is presented can be financially costly as each validation can have an associated fee (e.g., per validation). Additionally, utilization of an external validation system each time the sensitive value is presented can result in service latencies in processing computer transactions associated with the presented sensitive value.

Described herein are techniques for utilizing a cryptographic commitment to validate knowledge of sensitive value(s) without persistently storing the sensitive value(s). In some embodiments, once short authentication has been initially validated (e.g., using an external validation system), subsequent transaction(s) can be validated without resort to use of the external validation system which, in some examples, can result in cost savings and/or reduced transaction latencies.

Referring to FIG. 1, a system for validating short authentication data 100 is illustrated. In some embodiments, the system 100 is a component of a server and/or available as a cloud-based service. In some embodiments, the system 100, as a verifier, retains sensitive value(s), such as the short authentication data and/or the random number discussed below, in memory during validation; however, the sensitive value(s), and/or a recoverable version of either such as encrypted or hashed short authentication data, are not persistently stored. In some embodiments, once a commitment value has been calculated and stored, the short authentication data and/or the generated random number are removed from memory of the system 100 (as verifier). Thus, the system 100 as verifier has "zero knowledge" (persistently) of the short authentication data.

"Short authentication data" includes password(s) (e.g., alphanumeric), personal identification numbers and the like. In some embodiments, short authentication data comprises a pre-determined quantity and/or type of characters, for example, three numeral digits, four numeral digits, etc. In some embodiments, short authentication data comprises a pre-determined minimum quantity and/or type of character(s), for example, password must include at least three characters, one of which must be a symbol. In some embodiments, short authentication data comprises a pre-determined maximum quantity and/or type of characters, for example, password must be less than ten characters with each character being distinct.

The system 100 performs calculation(s) using the received short authentication data. In some embodiments, for short authentication data comprising numeral digits, the system 100 can utilize the short authentication data as received (e.g., without transformation). In some embodiments, for short authentication data comprising alphanumeric characters, the system 100 can transform the short authentication data into an integer representation. For example, each alphanumeric character, and, optionally position of the alphanumeric character, can be mapped to a value with the values summed or otherwise utilized to arrive at the integer representation which is then utilized by the system 100.

The system 100 includes a commitment component 130 that receives the short authentication data associated with a particular user from a client device 120 (e.g., mobile phone, desktop, laptop, tablet, watch, server, hand-held, programmable consumer or industrial electronics, set-top box, game system, compute node, etc.). In some embodiments, during a first validation, password/PIN change, password/PIN expiration, the commitment component 110 receives the short authentication data only after the particular user has been authenticated by an authentication component 130. The authentication component 130 can involve one or more authentication techniques for authenticating the particular user (e.g., two-factor authentication, an external validation service, etc.). In some embodiments, the authentication component 130 is a component of the system 100 and/or the server. In some embodiments, the authentication component 130 is external to the system 100 and/or the server.

In some embodiments, the commitment component 110 generates a random number and provides the generated random number to the client device 120 (e.g., random number 140 stored by the client device 130 for presentation during subsequent validation attempts). In some embodiments, the commitment component 110 receives a randomly generated number from the client device 120 which is also stored by the client device 120 (e.g., generated by the client device 120 in response to a request from the system 100).

In some embodiments, the commitment component 110 commits to the short authentication data (e.g., on behalf of the client device 120) by calculating a commitment value using the short authentication data (SAD), the generated random number and a secret value known only to the server. In some embodiments, the commitment value is calculated as follows. Let $g \in G_q$, $h \in G_q$ where q is a large prime number, $G_q$ is a group of order q, and g is a generator of $G_q$. Also, let $h=g^x$ where x is the secret known only by the server. The server commits to a k=SAD (on behalf of the client device 120) as follows:

$$r = \{0,1\}^* \in Z_q \quad \text{(Eq. 1)}$$

$$c = g^k h^r \quad \text{(Eq. 2)}$$

where c is the commitment, and r is the generated random number. The commitment c can be opened by revealing the random number r and k (SAD). The prime number q should be large enough to ensure that the discrete logarithm problem is difficult in $G_q$. The base scheme is also known as Pedersen Commitments, which, in some embodiments, the system 100 employs to validate the SAD without persistently storing the SAD.

In some embodiments, the client component 130 commits to the short authentication data (e.g., on behalf of the client device 120) by calculating the commitment value of Eq. 2 using the short authentication data, the generated random number and a calculated value (h) provided by the commitment component 110 (based on the secret value known only to the server). The client component 130 can provide the commitment value to the system 100 for storage and use during subsequent validation(s).

The commitment component 110 stores the commitment value associated with the particular user in a commitment store 150. The commitment component 110, the system 100 and/or the server does not persistently store the short authentication data and/or the generated random number. Thus, in some embodiments, for a particular stored commitment value, k (SAD) is not recoverable by the system 100 since without r but with a fixed k, the system 100 can only compute $g^k \cdot (g^r)^x$, which still hides k (SAD) by the unknown r.

In some embodiments, commitment value(s) can be stored in the commitment store 150 based upon a Globally Unique Identifier (GUID) associated with the particular user. In some embodiments, a particular user can have a plurality of commitment values for various accounts stored in the commitment store 150. The commitment values can be stored in the commitment store 150 based upon a GUID associated with the particular user and an account identifier.

Figure 2:
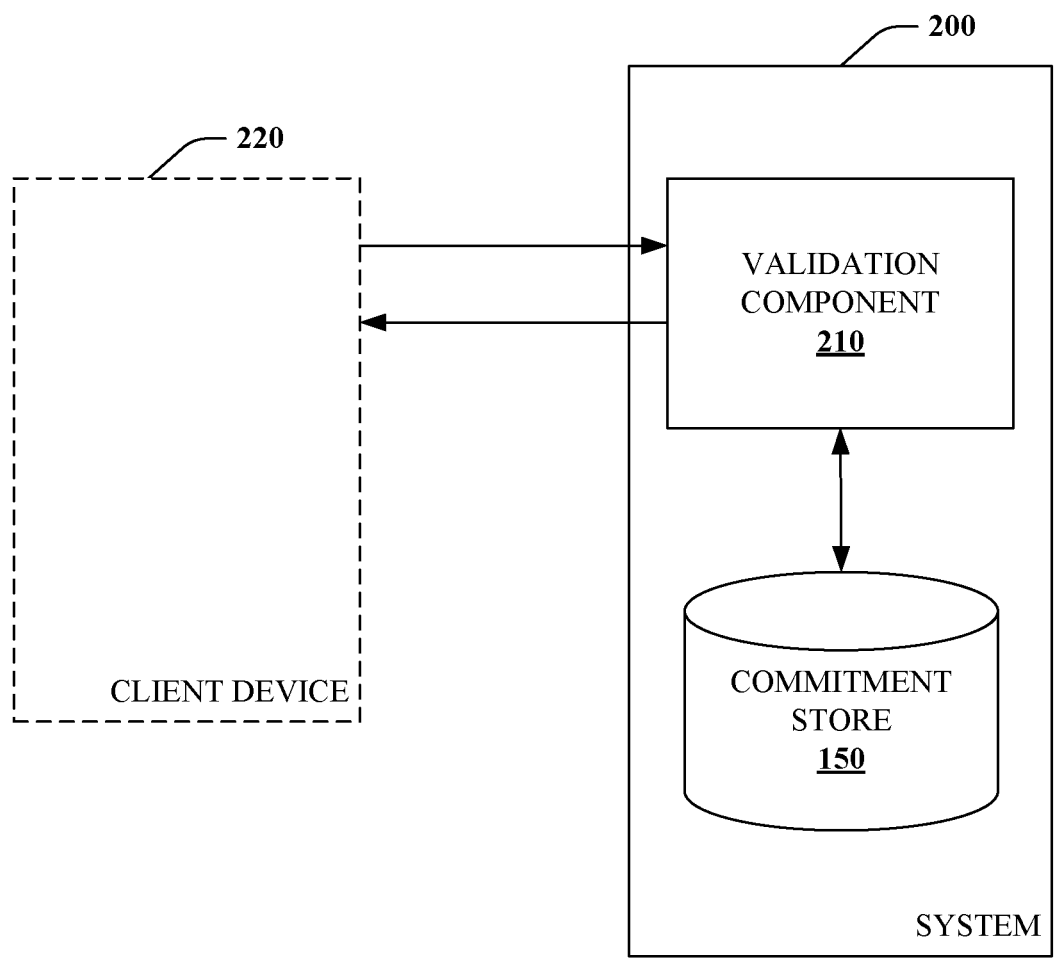
FIG. 2 is a functional block diagram that illustrates a system for validating a presented short authentication data.

Turning to FIG. 2, a system for validating a presented short authentication data 200 is illustrated. With the system 200, once stored, the commitment value described above can be used to subsequently validate the particular user using a presented short authentication data. In some embodiments, the presented short authentication data can be used in conjunction with a computer transaction, for example, the short authentication data acting as a security feature which must be validated (e.g., presented short authentication data proven to be correct) before the computer transaction is allowed to occur.

In some embodiments, the system 200 is a component of a server and/or available as a cloud-based service. In some embodiments, the system 200 as a verifier retains sensitive value(s), such as the presented short authentication data and/or the random number discussed below, in memory during validation; however, the sensitive value(s) and/or a recoverable version of either such as encrypted or hashed short authentication data are not persistently stored by the system 200. In some embodiments, once a commitment value has been calculated and the presented short authentication data determined to be valid or invalid, the presented short authentication data and/or the generated random number are removed from memory of the system 200 (as verifier) and not persistently stored.

The system 200 performs calculation(s) using the presented short authentication data. In some embodiments, for presented short authentication data comprising numeral digits, the system 200 can utilize the presented short authentication data as received (e.g., without transformation). In some embodiments, for short authentication data comprising alphanumeric characters, the system 200 can transform the short authentication data into an integer representation. For example, each alphanumeric character, and, optionally position of the alphanumeric character, can be mapped to a value by unambiguously encoding the octet of characters to an octet of bytes to form an integer value of multiple octets long, or otherwise utilized to arrive at the integer representation which is then utilized by the system 200. One example of unambiguously converting passwords to large integers is to encode a password in ASCII or UTF-8 (RFC2279).

The system 200 includes a validation component 210 that receives presented short authentication data and a random number (e.g., stored random number 140 provided by commitment component 110 and/or generated and stored by the client device 120) from a client device 220 (e.g., mobile phone, desktop, laptop, tablet, watch, server, hand-held, programmable consumer or industrial electronics, set-top box, game system, compute node, etc.). The validation component 210 calculates a value associated with the presented short authentication data using the presented short authentication data, the received random number and a secret value known only to the server (x). As discussed above, let $g \in G_q$, $h \in G_q$ where q is a large prime number, $G_q$ is a group of order q, and g is a generator of $G_q$. Also, let $h=g^x$ where x is the secret known only by the server. In some embodiments, the value associated with the presented short authentication data (y) is calculated as follows:

$$y = g^k \cdot h^r \quad \text{(Eq. 3)}$$

where k of Eq. 3 is the presented short authentication data and r of Eq. 3 is the received random number.

The validation component 210 retrieves the stored commitment value associated with the particular user from the commitment store 150. The validation component 210 then determines whether or not the value associated with the presented short authentication data is equal to the stored commitment value.

If the value associated with the presented short authentication data is equal to the stored commitment value, the presented short authentication data is valid. If the value associated with the presented short authentication data is not equal to the stored commitment value, then the presented short authentication data is not valid.

In some embodiments, based upon the determination by the validation component 210 that the presented short authentication data is valid, the system 200 allows a computer transaction to occur. In some embodiments, based upon the determination by the validation component 210 that the presented short authentication data is invalid, the system 200 blocks a computer transaction from occurring.

In some embodiments, for a particular stored commitment value, k (SAD) is not recoverable by the system 200 since without r but with a fixed k, the system 100 can only compute $g^k \cdot (g^r)^x$, which still hides k (SAD) by the unknown r. In some embodiments, the commitment value (c) is stored by the system 200 in order to prevent an entity other than the particular user from engaging in the computer transaction. Proof that an entity other than the particular user (with knowledge of the SAD and generated random number (r)) is not generally able to fool the system 200 to accept a different SAD is as follows: Given a commitment c, an entity (e.g., malicious client) must solve $c=g^k h^r$ for r and k. In some embodiments, the search space for k is exceptionally small; thus k can be treated as a constant in modeling an adversary. Thus, the problem is finding r'≠r for a fixed c and a fixed k, which reduces to the discrete log problem. The problem remains the same when written as $c=g^{k+xr}$ since the entity (e.g., malicious client) doesn't know x.

Figure 3:
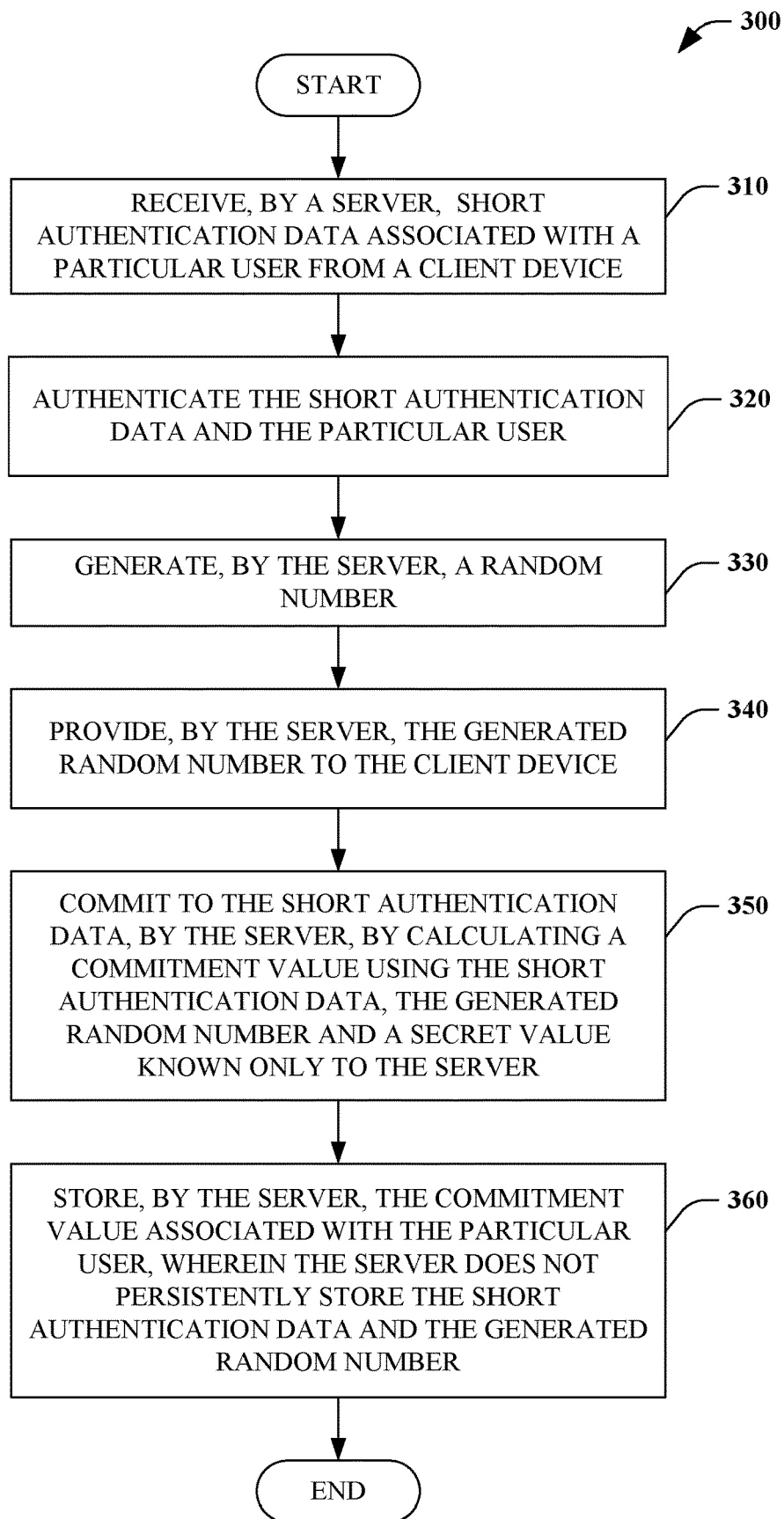
FIG. 3 is a flow chart that illustrates a method of validating short authentication data.
Figure 4:
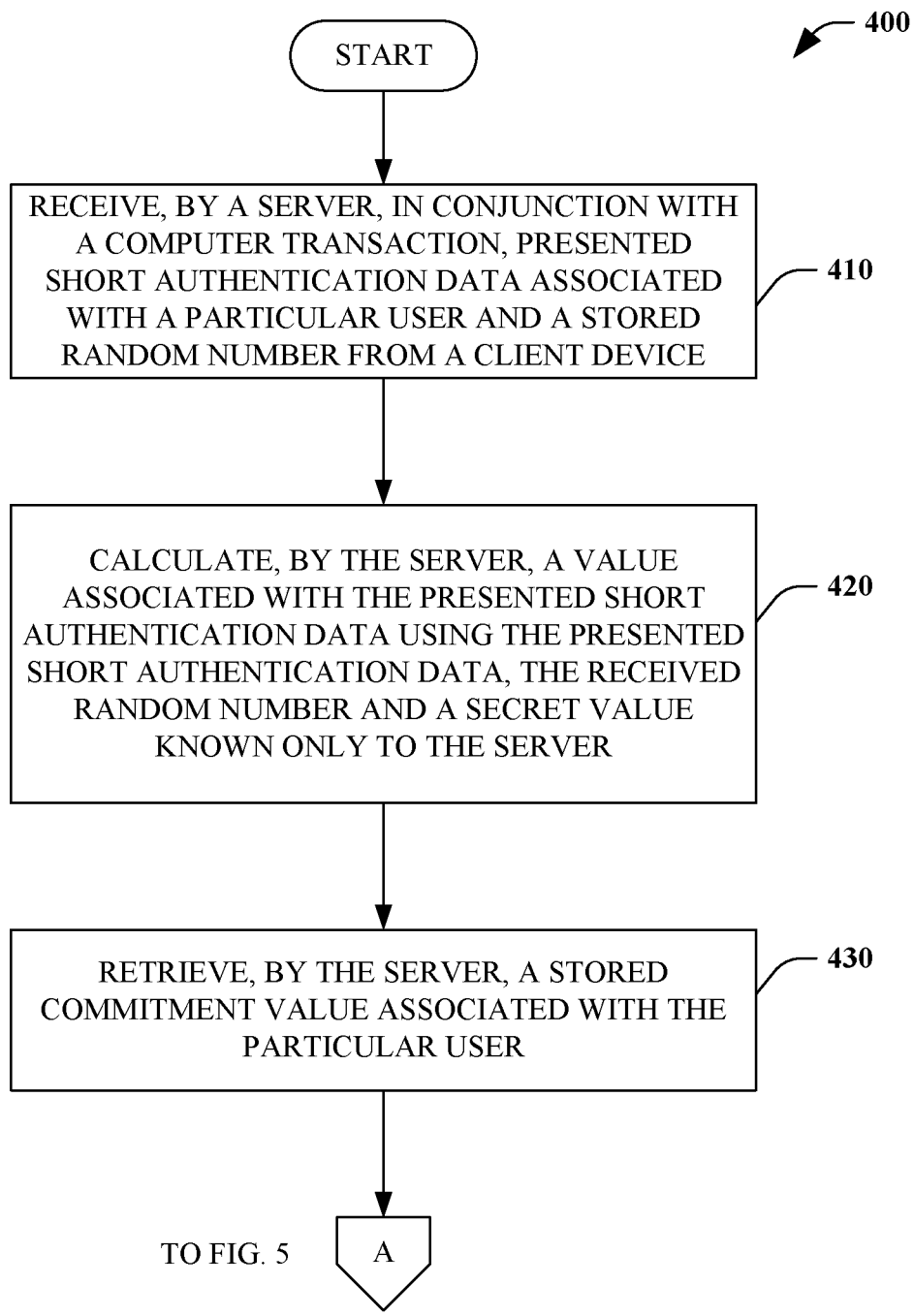
FIGS. 4 and 5 are flow charts that illustrate a method of validating presented short authentication data.
Figure 5:
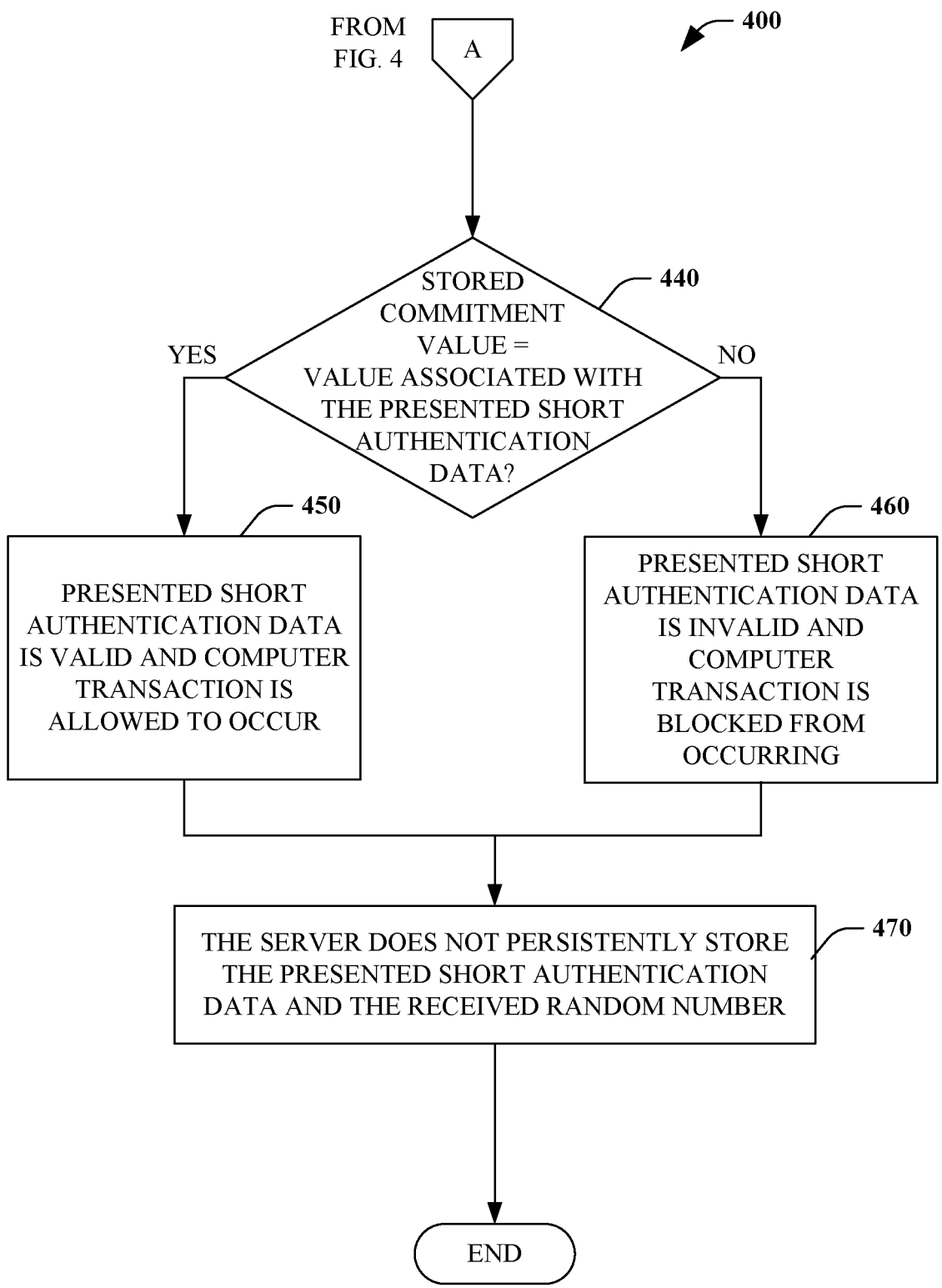

FIGS. 3-5 illustrate exemplary methodologies relating to validating short authentication data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of validating short authentication data 300 is illustrated. In some embodiments, the method 300 is performed by the system 100. At 310, short authentication data associated with a particular user is received by a server from a client device. At 320, the short authentication data and the particular user are authenticated.

At 330, a random number is generated by the server. At 340, the generated random number is provided by the server to the client device.

At 350, the short authentication data is committed by the server by calculating a commitment value using the short authentication data, the generated random number and a secret value known only to the server. In some embodiments, the server commits to the short authentication data on behalf of the client device using Eq. 1 and Eq. 2 above.

At 360, the commitment value associated with the particular user is stored by the server. The server does not persistently store the short authentication data and/or the generated random number.

Referring to FIGS. 4 and 5, a method of validating presented short authentication data 400 is illustrated. In some embodiments, the method 400 is performed by the system 200. At 410, in conjunction with a computer transaction, presented short authentication associated with a particular user and a stored random number is received by a server from a client device.

At 420, the server calculates a value associated with the presented short authentication data using the presented short authentication data, the received random number and a secret value known only to the server. In some embodiments, the server calculates the value associated with the presented short authentication using Eq. 3 above.

At 430, a stored commitment value associated with the particular user is retrieved by the server. At 440, a determination is made as to whether or not the stored commitment value is equal to the value associated with the presented short authentication data. If the determination at 440 is YES, at 450, the presented short authentication data is valid and the computer transaction is allowed to occur, and, processing continues at 470. If the determination at 440 is NO, at 460, the presented short authentication data is invalid and the computer transaction is blocked from occurring, and, processing continues as 470. At 470, the server does not persistently store the presented short authentication data and/or the received random number.

Described herein is a system for validating short authentication data, comprising: a processing system comprising a processor and a memory having computer-executable instructions stored thereupon which, when executed by the processor, cause the processing system to: receive, by a server, short authentication data associated with a particular user from a client device; generate, by the server, a random number; provide, by the server, the generated random number to the client device; commit to the short authentication data, by the server, by calculating a commitment value using the short authentication data, the generated random number and a secret value known only to the server; and store, by the server, the commitment value associated with the particular user, wherein the server does not persistently store the short authentication data and the generated random number.

The system can further include wherein the short authentication data is associated with a particular account of the particular user. The system can include the memory having further computer-executable instructions stored thereupon which, when executed by the processor, cause the processing system to: authenticate the particular user using at least one of two-factor authentication or an external validation service. The system can further include wherein the short authentication data comprises an alpha numeric password which is transformed by the system into an integer representation which is then utilized by the system to calculate the commitment value.

The system can further include wherein the short authentication data comprises only a predetermined quantity of numeral digits. The system can further include wherein the commitment value is calculated using the equation:

$$c = g^k h^r$$

where c is the commitment value, g is a generator of $G_q$, q is a prime number, $G_q$ is a group of order q, k is the short authentication data, $h = g^x$, x is the secret known only by the server, and r is the generated random number.

The system can further include the memory having further computer-executable instructions stored thereupon which, when executed by the processor, cause the processing system to: receive, by the server, in conjunction with a computer transaction, a presented short authentication data purportedly associated with the particular user and a random number; calculate, by the server, a value associated with the presented short authentication data using the presented short authentication data, the random number and the secret value known only to the server; retrieve, by the server, the stored commitment value associated with the particular user; determining whether or not the value associated with the presented short authentication data is equal to the stored commitment value; if the value associated with the presented short authentication data is equal to the stored commitment value, then the presented short authentication data is valid and the computer transaction is allowed to occur; and if the value associated with the presented short authentication data is not equal to the stored commitment value, then the presented short authentication data is not valid and the computer transaction is blocked from occurring.

Described herein is a method of validating a presented short authentication data, comprising: receiving, by a server, in conjunction with a computer transaction, the presented short authentication data associated with a particular user and a stored random number from a client device; calculating, by the server, a value associated with the presented short authentication data using the presented short authentication data, the random number and a secret value known only to the server; retrieving, by the server, the stored commitment value associated with the particular user; determining whether or not the value associated with the presented short authentication data is equal to the stored commitment value; if the value associated with the presented short authentication data is equal to the stored commitment value, then the presented short authentication data is valid and the computer transaction is allowed to occur; and if the value associated with the presented short authentication data is not equal to the stored commitment value, then the presented short authentication data is not valid and the computer transaction is blocked from occurring.

The method can further include wherein the short authentication data is associated with a particular account of the particular user. The method can further include wherein the presented short authentication data comprises an alpha numeric password which is transformed into an integer representation which is then utilized to calculate the value associated with the presented short authentication data. The method can further include wherein the presented short authentication data comprises only a predetermined quantity of numeral digits.

The method can further include wherein the value associated with the presented short authentication data is calculated using the equation:

$$y = g^k \cdot h^r$$

where y is the value associated with the presented short authentication data, g is a generator of $G_q$, q is a prime number, $G_q$ is a group of order q, k is the presented short authentication data, $h = g^x$, x is the secret known only by the server, and r is the received random number.

Described herein is a computer storage media storing computer-readable instructions that when executed cause a computing device to: receive, by a server, short authentication data associated with a particular user from a client device; generate, by the server, a random number; provide, by the server, the generated random number to the client device; commit to the short authentication data, by the server, by calculating a commitment value using the short authentication data, the generated random number and a secret value known only to the server; and store, by the server, the commitment value associated with the particular user, wherein the server does not persistently store the short authentication data and the generated random number.

The computer storage media can further include wherein the short authentication data is associated with a particular account of the particular user. The computer storage media can store further computer-executable instructions stored thereupon which when executed cause the computing device to: authenticate the particular user using at least one of two-factor authentication or an external validation service.

The computer storage media can further include wherein the short authentication data comprises an alpha numeric password which is transformed into an integer representation which is then utilized to calculate the commitment value. The computer storage media can further include wherein the short authentication data comprises only a predetermined quantity of numeral digits.

The computer storage media can further include wherein the predetermined quantity of numeral digits is three or four. The computer storage media can further include wherein the commitment value is calculated using the equation:

$$c = g^k h^r$$

where c is the commitment value, g is a generator of $G_q$, q is a prime number, $G_q$ is a group of order q, k is the short authentication data, $h = g^x$, x is the secret known only by the server, and r is the generated random number.

The computer storage media can include further computer-executable instructions stored thereupon which when executed cause the computing device to: receive, by the server, in conjunction with a computer transaction, a presented short authentication data purportedly associated with the particular user and a random number; calculate, by the server, a value associated with the presented short authentication data using the presented short authentication data, the random number and the secret value known only to the server; retrieve, by the server, the stored commitment value associated with the particular user; determining whether or not the value associated with the presented short authentication data is equal to the stored commitment value; if the value associated with the presented short authentication data is equal to the stored commitment value, then the presented short authentication data is valid and the computer transaction is allowed to occur; and if the value associated with the presented short authentication data is not equal to the stored commitment value, then the presented short authentication data is not valid and the computer transaction is blocked from occurring.

Figure 6:
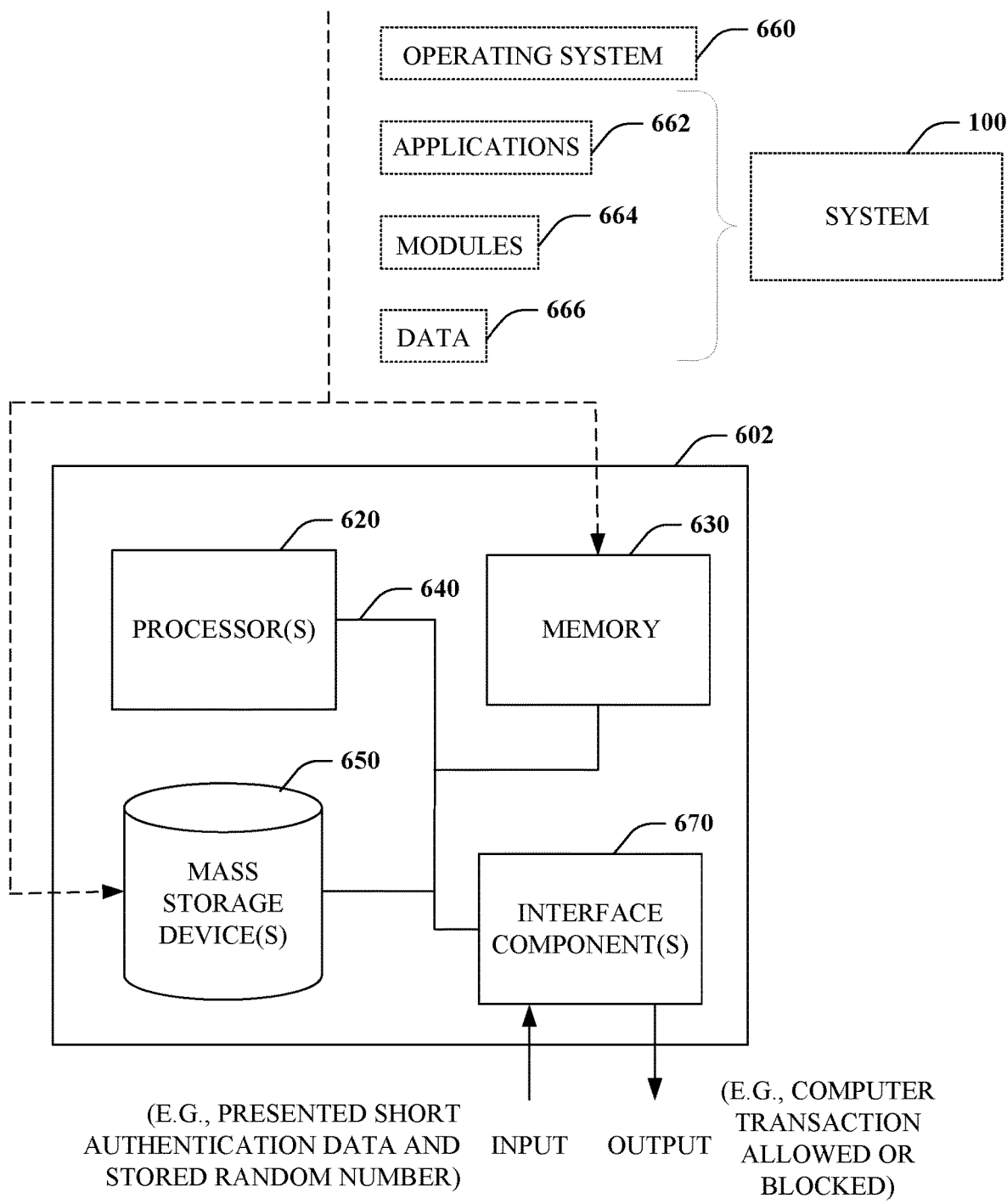
FIG. 6 is a functional block diagram that illustrates an exemplary computing system.

With reference to FIG. 6, illustrated is an example general-purpose processing system, computer or computing device 602 (e.g., mobile phone, desktop, laptop, tablet, watch, server, hand-held, programmable consumer or industrial electronics, set-top box, game system, compute node, etc.). For instance, the computing device 602 may be used in a system for validating short authentication data 100 and/or a system for validating a presented short authentication data 200.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device(s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
  a processor; and
  a memory having computer-executable instructions stored thereupon which, when executed by the processor, cause the system to:
  receive, from a client device, a first instance of short authentication data for verification of a particular user;
  generate a first number;
  provide the first number to the client device;
  determine a commitment value using the first instance of short authentication data, the first number, and a secret value; and
  store the commitment value in association with an identifier of the particular user, wherein the stored commitment value is usable to verify a second instance of short authentication data and a second number received during a subsequent validation attempt.

2. The system of claim 1, wherein the first instance of short authentication data is associated with a particular account of the particular user.

3. The system of claim 1, the memory having further computer-executable instructions stored thereupon which, when executed by the processor, cause the system to:
   authenticate the particular user using at least one of two-factor authentication or an external validation service prior to determining the commitment value.

4. The system of claim 1, wherein the first instance of short authentication data comprises a password.

5. The system of claim 1, wherein the first instance of short authentication data comprises only a predetermined quantity of numeral digits.

6. The system of claim 1, wherein the commitment value is calculated using the equation:

$$c = g^k \cdot h^r$$

where c is the commitment value,
   g is a generator of $G_q$,
   q is a prime number,
   $G_q$ is a group of order q,
   k is the first instance of short authentication data,
   $h = g^x$,
   x is the secret value, and
   r is the first number.

7. The system of claim 1, the memory having further computer-executable instructions stored thereupon which, when executed by the processor, cause the system to:
   receive the second instance of short authentication data and the second number during the subsequent validation attempt; and
   validate the second instance of short authentication data and the second number using the commitment value.

8. A method performed by a server, the method comprising:
   in association with a computer transaction, receiving, from a client device, a presented instance of short authentication data and a presented number for verification of a particular user;
   calculating a verification value using the presented instance of short authentication data, the presented number, and a secret value known only to the server;
   retrieving a stored commitment value associated with the particular user, wherein the stored commitment value was previously determined using a previously-received instance of short authentication data, a previously-generated random number, and the secret value;
   determining whether or not the verification value is equal to the stored commitment value;
   responsive to determining that the verification value is equal to the stored commitment value, determining that the presented instance of short authentication data is valid and allowing the computer transaction to occur; and
   responsive to determining that the verification value is not equal to the stored commitment value, determining that the presented instance of short authentication data is not valid and blocking the computer transaction from occurring.

9. The method of claim 8, wherein the previously-received instance of short authentication data is associated with a particular account of the particular user.

10. The method of claim 8, wherein the presented instance of short authentication data comprises an alpha numeric password, the method further comprising:
    transforming the presented instance of short authentication data into an integer representation; and
    utilizing the integer representation to calculate the verification value.

11. The method of claim 8, wherein the presented instance of short authentication data comprises only a predetermined quantity of numeral digits.

12. The method of claim 8, wherein the verification value is calculated using the equation:

$$y = g^k \cdot h^r$$

where y is the verification value,
   g is a generator of $G_q$,
   q is a prime number,
   $G_q$ is a group of order q,
   k is the presented instance of short authentication data,
   $h = g^x$,
   x is the secret value known only by the server, and
   r is the presented number.

13. A computer storage media storing computer-readable instructions that, when executed, cause a computing device to:
    receive, from a client device, a first instance of short authentication data associated with a particular user;
    generate a random number;
    provide the random number to the client device;
    determine a commitment value using the first instance of short authentication data, the random number, and a secret value; and
    store the commitment value in association with an identifier of the particular user, wherein the stored commitment value is usable to verify a subsequently-presented instance of short authentication data and a subsequently-presented number.

14. The computer storage media of claim 13, wherein the first instance of short authentication data is associated with a particular account of the particular user.

15. The computer storage media of claim 13, storing further computer-executable instructions which, when executed, cause the computing device to:
    authenticate the particular user using at least one of two-factor authentication or an external validation service prior to storing the commitment value.

16. The computer storage media of claim 13, wherein the first instance of short authentication data comprises an alpha numeric password.

17. The computer storage media of claim 13, wherein the first instance of short authentication data comprises only a predetermined quantity of numeral digits.

18. The computer storage media of claim 17, wherein the predetermined quantity of numeral digits is three or four.

19. The computer storage media of claim 13, wherein the commitment value is calculated using the equation:

$$c = g^k \cdot h^r$$

where c is the commitment value,
   g is a generator of $G_q$,
   q is a prime number,
   $G_q$ is a group of order q,
   k is the first instance of short authentication data,
   $h = g^x$,
   x is the secret value, and
   r is the random number.

20. The computer storage media of claim 13 having further computer-executable instructions stored thereupon which, when executed, cause the computing device to:
- receive the subsequently-presented instance of short authentication data and the subsequently-presented number in association with a computer transaction;
- calculate a verification value based at least on the subsequently-presented instance of short authentication data, the subsequently-presented number, and the secret value;
- allow the computer transaction to proceed when the verification value matches the commitment value; and
- block the computer transaction when the verification value does not match the commitment value.

* * * * *